United States Patent [19]

Ohta et al.

[11] Patent Number: 5,315,752

[45] Date of Patent: May 31, 1994

[54] METHOD FOR PRESS FITING OF A PRESS FITTING BODY AND A PRESS FITTING APPARATUS HAVING A LINEAR GAUGE FOR THE PRESS FITTING BODY

[75] Inventors: Masami Ohta, Isesaki; Masami Shimizu, Kiryu; Kazuo Niijima, Oota; Yasushi Kawakami, Kiryu, all of Japan

[73] Assignee: Mitsuba Electric Mfg. Co., Ltd., Gunma, Japan

[21] Appl. No.: 9,124

[22] Filed: Jan. 26, 1993

[30] Foreign Application Priority Data

Feb. 3, 1992 [JP] Japan ................................. 4-17911

[51] Int. Cl.⁵ ............................................. H02K 15/02
[52] U.S. Cl. ......................................... 29/598; 29/705; 29/720; 29/732; 29/256; 29/525
[58] Field of Search ................. 29/598, 525, 705, 720, 29/732, 256

[56] References Cited

U.S. PATENT DOCUMENTS

4,878,289 11/1989 Lautner et al. .................. 29/732 X

Primary Examiner—Carl E. Hall
Attorney, Agent, or Firm—Darby & Darby

[57] ABSTRACT

A method and an apparatus for press fitting characterized in permitting the simultaneous measurement of a press fitting body with the press fitting, and characterized in improving the accuracy of the press fitting. The method comprises the steps of: temporarily press fitting a press fitting body (8) from the top of a press fitted part of a press fitted member (20), located at a prespecified height with respect to the press fitted part, such that a ball screw shaft of a ball screw is moved downward by means of a servo motor and, consequently, the body (8) is press fitted to the press fitted part at a prespecified length; executing a zero adjustment of a linear gauge and a load cell, wherein the linear gauge is composed such that a measuring member (36) is in contact with a top end of a measured member (30) which moves together with the body (8), and the load cell is composed so as to measure a press fitting force of the body (8); constant size press fitting executed to the member (20) of the body (8) at a prespecified length; differential press fitting, executed in the case where the measured results, the measured results of the linear gauge and the load cell at the time when the constant size press fitting process is terminated, are in prespecified ranges, and wherein the body (8) is press fitted to the member (20) according to the difference between the results and an objective length; and determining, whether or not the press fitted length, set by the differential press fitting step, is equal to the specified press fitting length.

4 Claims, 6 Drawing Sheets

METHOD FOR PRESS FITING OF A PRESS FITTING BODY AND A PRESS FITTING APPARATUS HAVING A LINEAR GAUGE FOR THE PRESS FITTING BODY

FIELD OF THE INVENTION

The present invention relates to a method for press fitting of a press fitting body and a press fitting apparatus having a linear gauge for the press fitting body, especially for that utilized for a press fitting apparatus for press fitting an armature shaft to an armature core of a motor of an automobile.

BACKGROUND ART

Conventionally, an armature core of a motor has been press fitted to an armature shaft by means of a presser having a hydraulic cylinder.

In the case where a portion that is pushed out and projecting from the armature core (i.e. an one end of the armature shaft in the press fitting direction) is required to have a specific length, a stopper should be provided at a position within a prespecified distance from the touching surface between the armature core and a jig holding the armature. Therefore, the end of the projecting armature shaft is stopped by the stopper so that the relative position of the armature core and the armature shaft can be set at the desired distance. The above method is called a constant size press fitting method.

However, in the above method, it is difficult to exchange the stopper when various relative positions are required for a plurality of armature cores and armature shafts, and when various types of products are to be manufactured. Furthermore, when the stopper is worn, the press fitted length of the armature shaft with respect to the armature core will become variable so that the entire armature assembly will be variable and consequently the reliability of the product will not be maintained. In addition, when the armature shaft is pushed out by the presser and collides with the worn stopper, the armature shaft will be chewed by the presser and the stopper, and the hydraulic pressure of the driving cylinder that is applied. Therefore, the thin shaft of the press fitting body may be bent during this process.

SUMMARY OF THE INVENTION

Accordingly, it is a primary objective of the present invention to provide a method for press fitting of a press fitting body and press fitting apparatus having a linear gauge for the press fitting body, wherein the press fitted length of the press fitted member (i.e. the armature shaft) can be measured at the same time as the press fitting process.

It is another objective of the present invention to obtain high accuracy in the press fitting so as to improve the reliability of the products.

A more specific objective of the present invention is to prevent the press fitting body from bending even when the press fitting body is a comparatively thin one.

In a first aspect of the present invention, there is provided a method for press fitting comprising the steps of:

(a) temporarily press fitting a press fitting body from above a press fitted part of a press fitted member, located at a prespecified height to the press fitted part, such that a ball screw shaft of a ball screw is moved downward by means of a servo motor and such that the press fitting body is press fitted to the press fitted part at a prespecified length;

(b) executing a zero adjustment of a linear gauge and a load cell, wherein the linear gauge is composed such that a measuring member is in contact with a top end of a measured member which moves together with the press fitting body, and the load cell is composed so as to measure a press fitting force of the press fitting body;

(c) constant size press fitting, further executed to the press fitted member, of the press fitting body a prespecified length;

(d) differential press fitting, executed in the case where the measured results, the measured results of the linear gauge and those of the load cell at the time when the constant size press fitting process is terminated, are within prespecified ranges, wherein the press fitting body is press fitted to the press fitted member according to a difference between the measured results and a specified press fitting length so that consequently the specified press fitting length of the press fitting body with respect to the press fitted member can be attained; and (e) determining, whether or not the press fitted length, set by the differential press fitting step, equals the specified press fitting length.

DESCRIPTION OF THE PREFERRED EMBODIMENT

Further objectives and advantages of the present invention will be apparent from the following description, with reference to the accompanying drawings wherein a preferred embodiment of the present invention is clearly shown.

Figure 4:
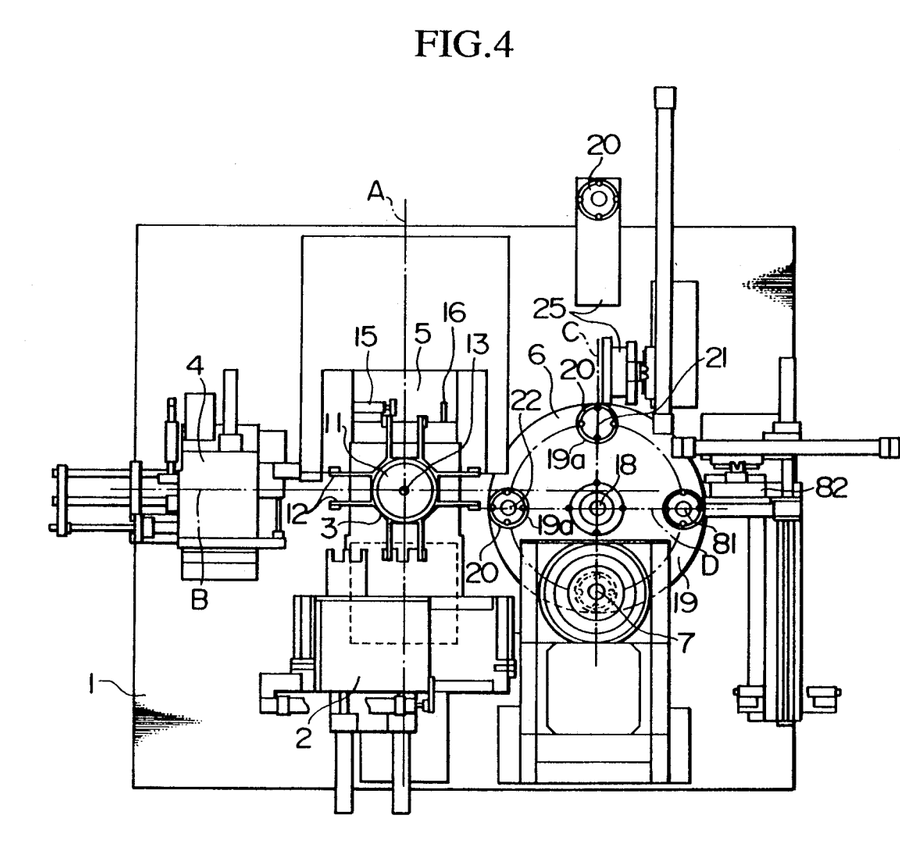
FIG. 4 is a plane view of the preferred embodiment.

FIG. 4 shows a shaft processing and press fitting apparatus of the armature core according to a preferred embodiment of the present invention. The apparatus consists mainly of a base plate 1, a shaft stocker 2, a sub index 3, a length measuring part 4, a knurller 5, a main index 6, an armature core supplier 21, a temporary shaft inserter 22, a final press fitter 7 of the shaft, and an armature core discharger 81.

The shaft stocker 2, is box-like in shape, disposed above the base plate 1 as shown in FIG. 4, and stores a lot of round-bar shaped armature shafts 8 (i.e. the press fitting body, see FIG. 1) which are arranged horizontally. Similar to the conventional technique, a shaft supplying hole (not shown) in the bottom of the shaft stocker 2, is provided so shown) in the bottom of the shaft stocker 2, is provided so as to intermittently supply the armature shaft 8 stocked in the shaft stocker 2, to the subindex 3.

The subindex 3 provided on the turn table 11 is shaped such as the character "#" consists of two pair of parallel arms 12 which overhang from four orthogonal sides of the regular octagonal-shaped turn table 11. At every "90" degrees, the subindex 3 is rotatable around the shaft 13 and is vertically movable along the base plate 1. The arms 12, which have the same shape, are formed with "V"-shaped recesses at the ends so as to allow the armature shaft 8 to be inlayed therein. The subindex 3, adjoining the shaft stocker 2, receives the armature shaft 8 from the shaft stocker 2 at the recesses of arm 12 so as to inlay the shaft 8 in the recesses.

The length measuring part 4 is provided adjacent to a specific end of a central axis B, which orthogonally intersects a central axis A that connects the center of the shaft stocker 2 and the shaft 13 of the subindex 3. The length measuring part 4 receives the armature shaft 8 from the arm 12 of the subindex 3 by means of a feeding mechanism (not shown), and measures the length of the armature shaft 8 by means of a measuring means (not shown) provided in the length measuring part 4. Then, the measured armature shaft 8 is carried again to the subindex 3 by means of the feeding mechanism and inlayed into the recess on the arm 12. Needless to say, the length measuring part 4 which can be embodied by various conventional techniques is not included in the present invention. The subindex 3 is stopped when the arm 12 positions are either parallel or orthogonal to the central axis A.

In the opposite area of the shaft stocker 2, a knurller 5 is located proximity to the subindex 3. The knurller 5 contains a cylinder mechanism 15 and a stopper 16 which is separated from and faces to the cylinder mechanism 15. The cylinder mechanism 15 and stopper 16 are parallel to the central axis B. More specifically, when the arm 12 is parallel to the central axis A, the cylinder mechanism 15 will be adjacent to the length measuring part 4, while the stopper 16 will be on the opposite side. Though they are not shown, the knurller 5 also contains a hydraulic cylinder assembly and a presser having lower and upper dies. The presser presses, by means of the upper and lower dies, and knurls the armature shaft 8 when the shaft 8 is lightly fixed between the cylinder mechanism 15 and the stopper 16, and is set in the lower die such that one end of the shaft 8 is in contact with the stopper 16, and another end of the shaft 8 is lightly pushed by the cylinder mechanism 15 wherein the pushing force of the cylinder mechanism 15 is only sufficient for supporting the shaft 8.

At the opposite side of the length measuring part 4 of the subindex 3, the main index 6 is rotatable around the shaft 18. The main index 6 contains a turn table 19 which has four core installers 19a which are shaped to fit the the armature core 20 (press fitted member) therein, and are located at four positions dividing the table 19 into quarters. The main index 6 will be stopped when the armature core 20, fitted on the index 6, is carried to either of four stations. Two of those stations, the final press fitter 7 of the shaft and the armature core discharger 81, are located on a central axis C that passes the shaft 18 and is parallel to the central axis A. The other two stations, the armature core supplier 21 and the temporary shaft inserter 22, are located on a central axis D that orthogonally cross the axis C at the shaft 18. Towards the final press fitter 7, the shaft 18 is separated at a prespecified distance from the central axis B of the subindex 3.

The armature core supplier 21 carries the armature core 20 to the core fitting position of the turn table 19 and fits the core 20 at the position by means of a core supplier 25, which is adjacent to the supplier 21 and consists of conventional feeding mechanisms.

Figure 5:
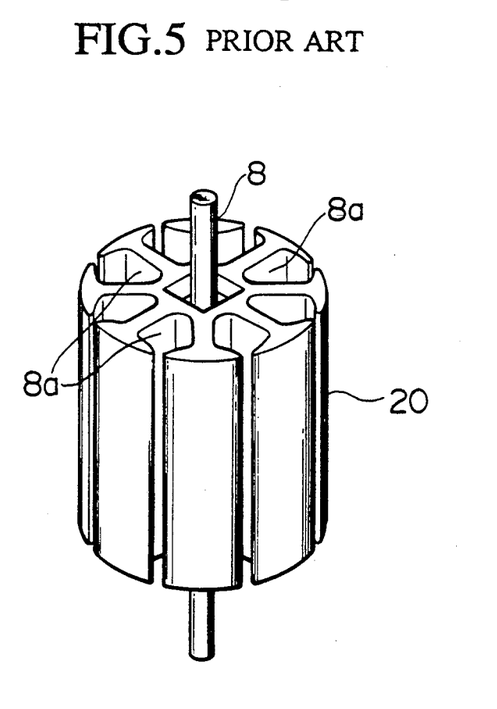
FIG. 5 is a perspective view showing the armature core fitted with the armature shaft according to the preferred embodiment.

FIG. 5 shows the column-shaped armature core 20 having a shaft hole through the center line of the column so as to be inserted into the armature shaft 8, and a plurality ("8" in this embodiment) of grooves 8a that are equidistant from and parallel to the center axis of the column.

The temporary shaft inserter 22 is provided with a temporary shaft insertion mechanism (not shown) so that the inserter 22 receives the armature shaft 8 from the arm 12 which is stopped adjacent to the inserter 22 in a horizontal position. Then, the inserter 22 turns the armature shaft 8 to a vertical position, and temporarily inserts a prespecified length of the shaft into the center shaft hole of the armature core 20 on the turn table 19 at the inserter 22.

The final press fitter 7 is composed as follows.

Figure 1:
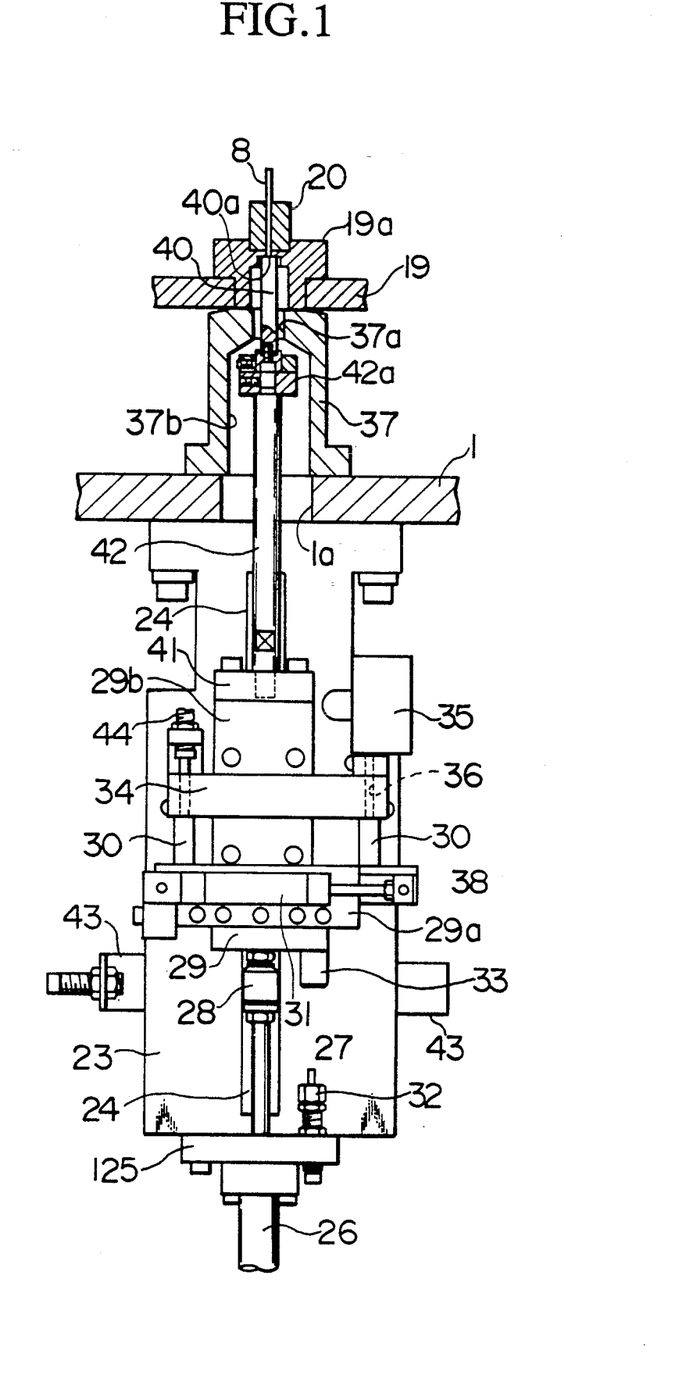
FIGS. 1 and 2 are partially schematic sectional front views of a press fitting apparatus according to a preferred embodiment of the present invention.

The support plate 23 is suspended from the lower surface of the base plate 1 and a board-shaped guide element 24 is attached to the center of the support plate 23. The cylinder mechanism 26 is attached to a lower part of support plate 23 via a bracket 125 and the position rod 23 is located in the upper portion of the cylinder mechanism. The piston rod 27 is connected to the cylinder mechanism by means of a joint 28, and a load receiving member 29, which moves vertically along the guide element 24. The base plate 29a of the load receiving member 29 is provided with a slider 38 which can slide horizontally. Both ends of the slider 38 have the same length and are fitted with two measured members 30 protruding upward from the slider 38. The top faces of the members 30 are flat and have the same altitude. The members 30 are connected with a cylinder mechanism 31 located along the horizontal axis on the load receiving member 29, so that the members 30 are horizontally movable.

The measured members 30 are exchangeable with other pairs of rod-shaped measured members (not shown), referred to as exchange measured members which have a projection with a length that is different from the load receiving member 29. In place of the measured members 30, the exchange measured members may be fitted with the load receiving member 29. Furthermore, the bottom face of the load receiving member 29 is fitted with a stopper 33 which contacts a shock absorber 32 provided on the top face of the bracket 125.

The support 23 is horizontally fastened to a bracket-shaped outer guide 34 in a manner such that when the load receiving member 29 is raised, the bottom face of the outer guide 34 will touch the top faces of the measured members 30. Furthermore, because the outer guide 34 has a bracket-shape, the vertical movement of a connection board 29b of the load receiving member 29 will be possible. As shown in FIG. 1, the right side of the upper portion of the guide 34 is fitted with a linear gauge 35. The linear gauge 35 is provided with a measuring member 36 which is loosely inserted to a hole (not shown) which passes through the outer guide 34. In the playing condition, the measuring member 36 contacts the top face of one of the measured members 30 with an appropriate pressure. Therefore, the gravitating length of the measured member 30 is measured by the linear gauge 35.

Meanwhile, the top face of the base plate 1 is provided with a cylinder-shaped pedestal 37 located on the same axis of the piston rod 27 of the cylinder mechanism 26. Both the top and lower end of the pedestal 37 is referred to as a minor diameter portion 37a and a larger diameter portion 37b, respectively. The minor diameter portion 37a is penetrated by a shaft catching rod 40 (i.e. stopper) made of a carbide punching material. On the top end of the shaft catching rod 40, is a flat shaft catching surface 40a (i.e. press fitting body catching surface). The bottom end of the shaft catching rod 40 is connected coaxially with an exclusive shaft 42 via a coupling 42a.

The exclusive shaft 42, loosely penetrates a through hole formed in the base plate 1, and is fitted to a rod joint 41 which is fastened to the top end of the connection board 29b such that the piston rod 27 of the cylinder mechanism 26, the exclusive shaft 42, and the shaft catching rod 40 are coaxial. In FIG. 1, the numeral 43 designates a proximity switch, and the numeral 44 designates a shock absorber.

Figure 2:
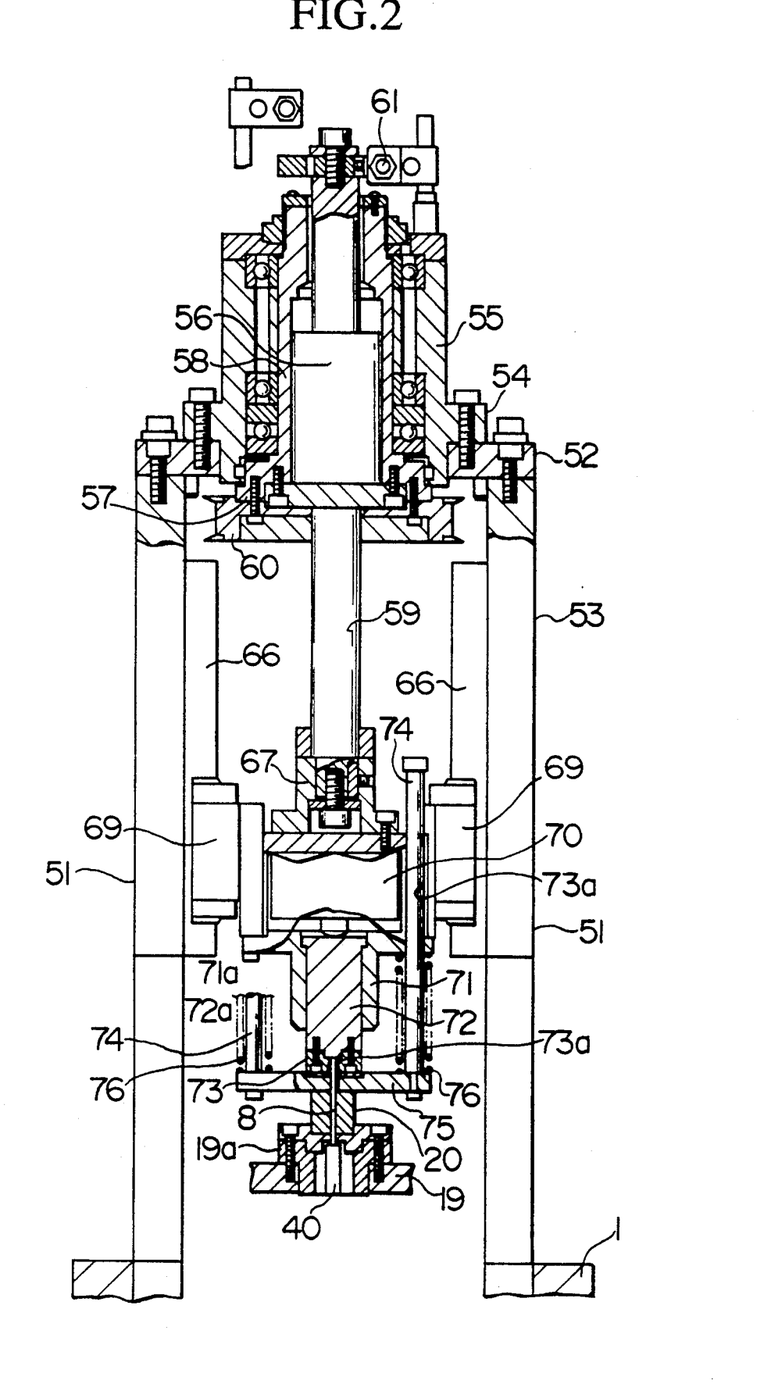

In FIG. 2, a gate-shaped bracket 53, consists mainly of two support boards 51 and a top board 52 fitted on the support boards 51, which, in turn, is fitted on the upper surface of base plate 1. The top board 52 is perforated at a top hole on which a bearing 55 is fixed by a flange 54 which is located near the upper surface of the top board 52. The bearing 55 supports a ball screw 56. As shown in FIG. 2, the ball screw 56 is provided with a shaft 59 which moves vertically along the shaft axis in response to the rotation of a cylinder 58 (i.e. the rotation means). Cylinder 58 is supported at a flange 57 by the bearing 55 and can rotate horizontally but not vertically, with respect to the shaft axis. The bottom face of the flange 57 is fixed with a pulley 60 which is coaxial with the ball screw shaft 59. The top end outer surface of the ball screw shaft 59 is connected with a proximity switch 61.

Figure 3:
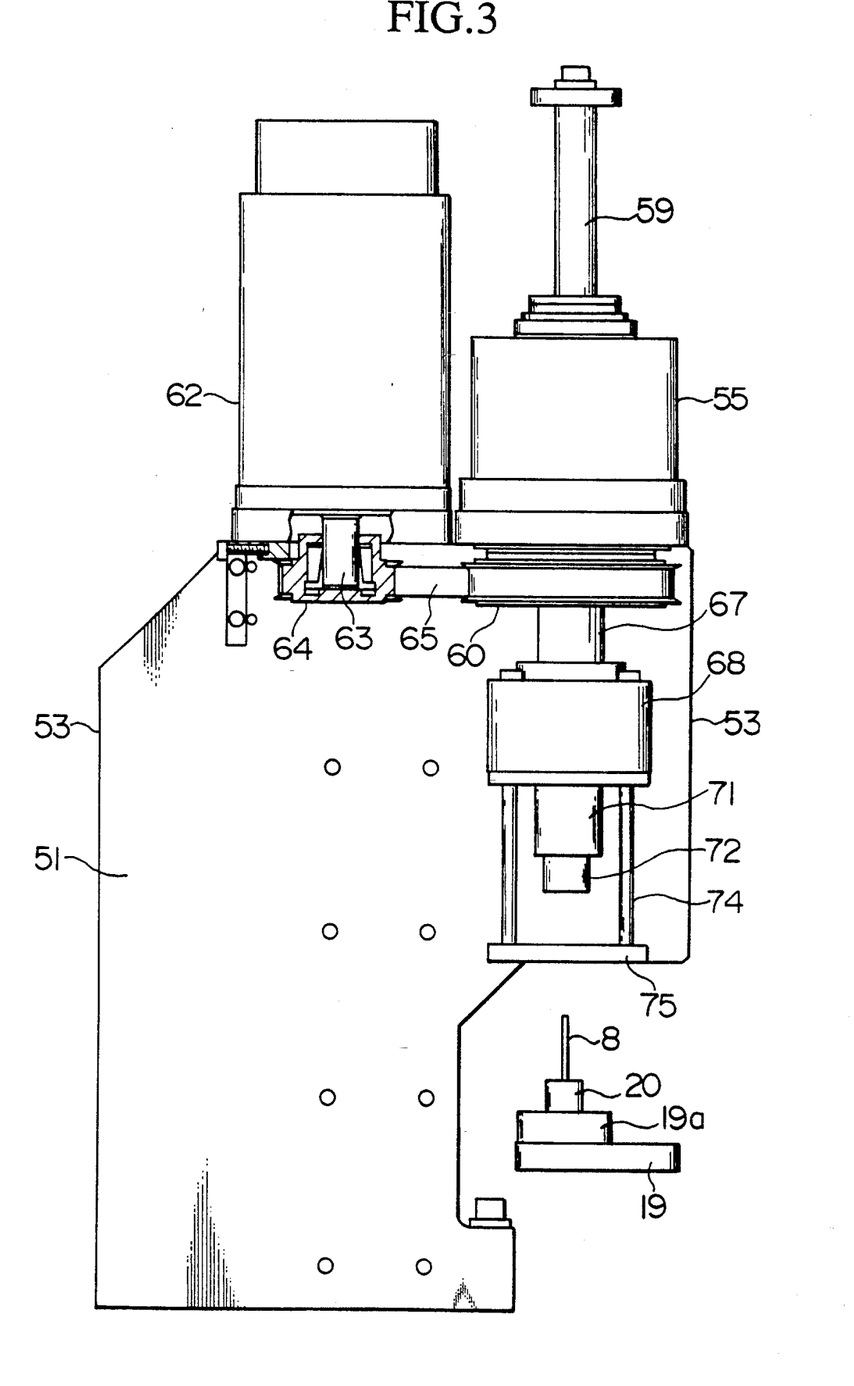
FIG. 3 is a partially schematic sectional side view of the preferred embodiment.

FIG. 3 shows the details of the upper portion of the bracket 53 fitted with a servo motor 62 which is adjacent to the bearing 55 such that the rotation axis 63 of the motor 62 is projecting downward into the base plate 1. The rotation axis 63 is fitted with a pulley 64. The pulley 64 and the pulley 60 in the lower portion of the bearing 55 are turned with a belt 65 so as to transfer the revolution of the rotation axis 63 of the servo motor 62 to the ball screw 56.

The support boards 51 of the bracket 53 are provided with guide rails 66. The bottom portion of the ball screw shaft 59 is fitted with a connection member 67 which is fitted with a vertical slider 68 (i.e. movable body). The sides of the vertical slider 68 are provided with fitting members 69 that are slidable, and with the guide rails 66 that are vertically movable. The fitting member 69 face towards the support boards 51 to prevent the rotation of the ball screw shaft 59. The vertical slider 68 is hollow and a load cell 70 is set at a prespecified position in the vertical slider 68. The vertical slider 68 is connected with a pressing shaft 72 via a downward guide pipe 71 having a flange. The pressing shaft 72 is coaxial with the exclusive shaft 42. The guide pipe 71 has a shoulder 71a on which an upper flange 72a of the pressing shaft 72 is engaged, so that the load cell 70 can be pressed by the top end of the pressing shaft 72.

Furthermore, the bottom of the pressing shaft 72 is fitted with a shaft guide 73 that is perforated with a guide hole 73a and runs along the axis of the shaft guide 73. The armature shaft 8 can be inserted into the guide hole 73a.

Four separate rods 74 are vertically inserted into the outer round portion of the vertical slider 68. The bottom ends of the rods 74 are connected with other rods in a connection board 75. The rods 74 loosely penetrate coil springs 76 laid between the flange of the guide pipe 71 and the connection board 75. The connection board 75 can be move down to contact the armature core 20 fitted on the core installer 19a of the turn table 19.

The armature core 20, fitted to the core installer 19a of the turn table 19, is discharged by the core discharger 82 adjoining the armature core discharger 81 and consists of conventional feeding mechanisms.

The armature core supplier 21, the subindex 3, the main index 6, the temporary shaft inserter 22, the final press fitter 7 of the shaft, and the armature core discharger 81 contain drivers which are appropriately controlled by a sequence controller (not shown).

Next, a description will be made of a press fitting method of the press fitting body and an operation of the press fitting apparatus which has the linear gauge and is based on the above-described apparatus according to the preferred embodiment of the present invention.

First, in preparation for the press fitting of the armature shaft 8 to the armature core 20, a plurality of the armature shaft 8 are arranged horizontally and stocked in the shaft stocker 2. Next, the press fitting apparatus with the linear gauge is provided with the final press fitter 7 of the shaft, and the cylinder mechanism 26 is shortened so that the shaft catching rod 40 is carried downward from the top face of the pedestal 37 via the joint 28, the load receiving member 29, the connection board 29b, the exclusive shaft 42, and the coupling 42a. Therefore, the measuring member 36 of the linear gauge 35 is also carried downward. The pressing shaft 72 is then raised by driving the servo motor 62 via the ball screw 56 so that when the armature core 20 reaches the final press fitter 7 of the shaft, the armature shaft 8, temporarily fitted on the armature core 20, is prevented from contacting the connection board 25 and the rods 74.

Next, when the apparatus is driven in the configuration shown in FIG. 4, the armature shafts 8 are sequentially supplied one by one, at an appropriate interval, from the bottom of the shaft stocker 2 to the subindex 3. The armature shafts 8 are then placed into the "V"-shaped recess of the arm 12 and are supported by the arm 12. The subindex 3, viewed from top, then rotates 90 degrees clockwise, and the arm 12 supporting the armature shaft 8 is carried to the length measuring part 4 and stopped.

Then, the arm 12, adjoining the length measuring part 4, passes the armature shaft 8 to the the part 4. Then, the length of the armature shaft 8 is measured by the length measuring part 4.

In the case where the measured results of the armature shaft 8 is acceptable, the armature shaft 8 is returned from the length measuring part 4 to the subindex 3 which further rotates 90 degrees and stops at the knurller 5. However, when the armature shaft 8 is determined to be inferior in the length measuring part 4, the armature shaft 8 is not passed from the length measuring part 4 to subindex 3. In this case, the subindex 3 further rotates 90 degrees, the arm 12 supporting the inferior armature shaft 8 is carried to the length measuring part 4, and the subindex 3 is stopped.

When the arm 12 supporting the armature shaft 8 is stopped at the knurller 5, the armature shaft 8 is passed from the arm 12 to the knurller 5 wherein one end of the armature shaft 8 is contacted by the stopper 16, between the cylinder mechanism 15 and the stopper 16, while another end is pushed by the cylinder mechanism 15. The armature shaft 8 set in the lower press die. The armature shaft 8 which is fixed between the cylinder mechanism 15 and the stopper 16 is then pressed by the upper and lower dies so that the knurlling process is executed for the armature shaft 8. Then, the processed armature shaft 8 is returned to the arm 12 adjoining the knurller 5.

Then, the subindex 3 further rotates 90 degrees in a clockwise direction, and the arm 12 supporting the knurlled and processed armature shaft 8 is stopped at a temporary shaft inserter which is adjacent to the part adjoining the temporary shaft inserter 22 of the main index 6. Meanwhile, the armature core 20 is fitted on the core fitting portion on the turn table 19 by the the core supplier 25, such that the central shaft hole of the core 20 is laid vertically in the armature core supplier 21. When the armature core 20 is fitted on the turn table 19, the main index 6, viewed from the upward of the turn table 19, rotates 90 degrees in a counter-clockwise direction (i.e. rotates in reverse with respect to the subindex 3). Then, the main index 6 is stopped when the armature core 20 fitted therewith reaches the temporary shaft inserter 22.

When the armature core 20, fitted with the turn table 19, reaches the temporary shaft inserter 22 so that the turn table 19 is stopped, the temporary shaft insertion mechanism (not shown) receives the armature shaft 8 in a horizontal position from the arm 12 of the subindex 3 and stops adjacent to the temporary shaft inserter 22. Then, the temporary shaft insertion mechanism maintains the armature shaft 8 in a vertical position, and temporarily inserts a prespecified length of the armature shaft 8 in a vertical position, into the center shaft hole of the armature core 20 at the temporary shaft inserter 22 on the turn table 19.

Then, the subindex 3 rotates 90 degrees in the same direction, the main index 6 rotates 90 degrees counter-clockwise, the armature core 20 which is temporarily inserted with the armature shaft 8 reaches the final press fitter 7 of the shaft, and the turn table 19 is stopped.

Then, utilizing the press fitting apparatus having the linear gauge, the armature shaft 8 is finally press fitted with the armature core 20. In this case, when the armature core 20, temporarily press fitted with the armature shaft 8, reaches the final press fitter 7 so that the turn table 19 is stopped, the cylinder mechanism 26 is extended and the shaft catching rod 40 is raised to a prespecified position. Simultaneously, the measured members 30 are raised so that the top faces of the measured members 30 contact the bottom face of the outer guide 34 so that the measured members 30 are stopped. In this case, the measuring member 36 of the linear gauge 35, the bottom face of which touches the top face of measured members 30, also rises. Meanwhile, the armature shaft 8 is fed from the shaft stocker 2 to the arm 12 of the subindex 3 adjoining the shaft stocker 2.

Figure 6:
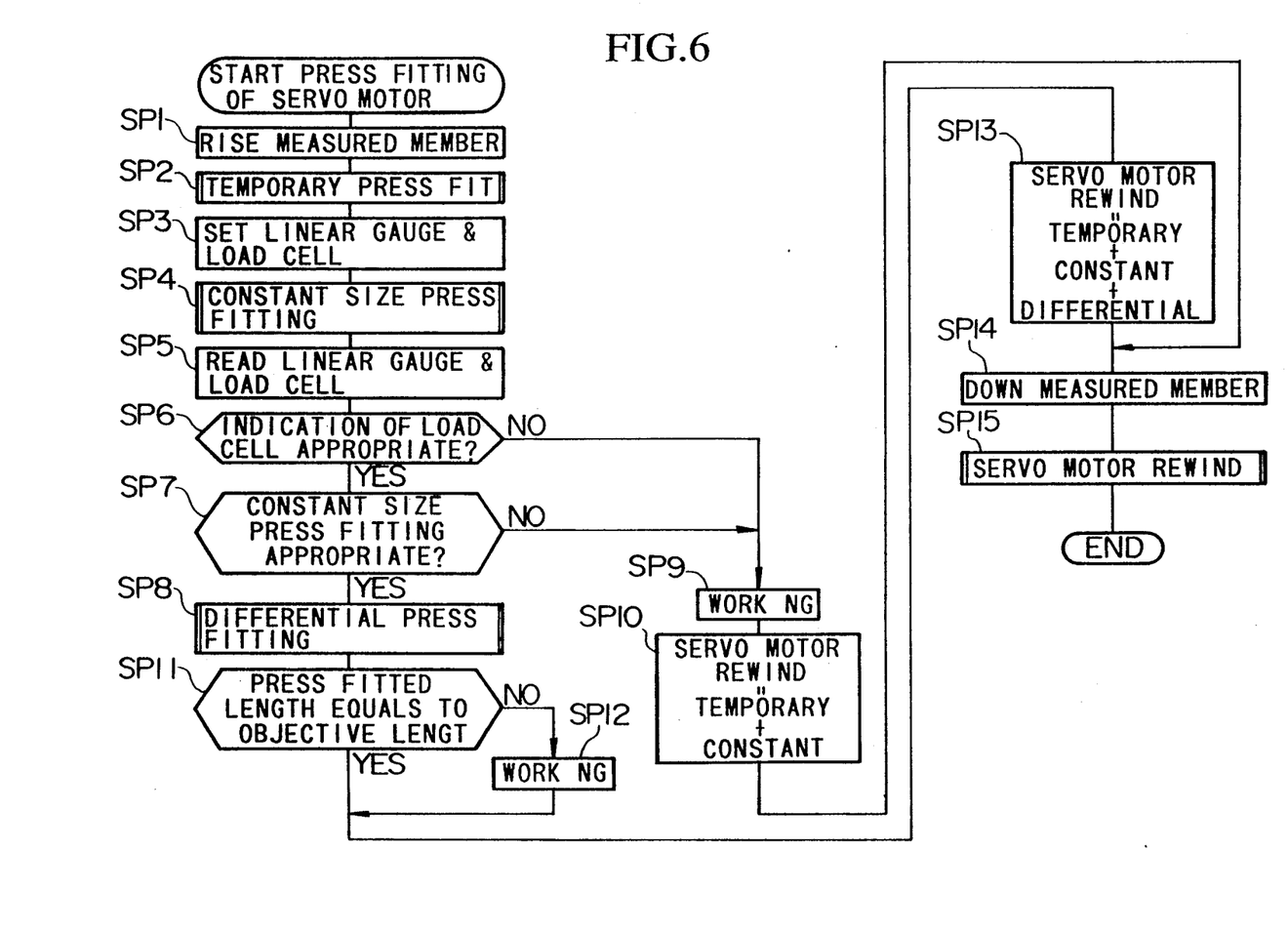
FIG. 6 is a flow chart of the preferred embodiment.

Next, referring to FIG. 6, a description will be made of the final press fitting of the the armature shaft 8 of the armature core 20 which is executed by the final press fitter 7.

In step SP1, when the press fitting process of the servo motor starts, the cylinder mechanism 26 operates so that the rod 40 and the measured member 30 are raised, and the measured member 30 contacts the measuring member 36 as described above.

Then, the process moves to step SP2 wherein the servo motor 62 is rotated, at prespecified times, at high-speed. As a result, a cylinder 58 of the ball screw 56 rotates via the pulleys 60, 64 and the belt 65. The vertical slider 68 moves downward, by a prespecified length, together with the ball screw shaft 59. The guide hole of the connection board 75 is penetrated with the armature shaft 8, and the armature core 20 is pressed against the core installer 19a of the turn table 19 via the coil springs 76 by means of the connection board 75. Consequently, the vertical slider 68 moves further downward, the armature shaft 8 is inserted into the guide hole 73a of the shaft guide 73, the bottom face of the pressing shaft 72 contacts the armature shaft 8, and the pressing shaft 72 is stopped when the armature shaft 8 is press fitted to the armature core 20. In this step and the following steps, the force applied to the core installer 19a is applied to the support 23 via the load cell pedestal 37. The process then moves to step SP3 wherein zero-adjustments of the linear gauge 35 and the load cell 70 are executed.

In step SP4, the servo motor 62 is rotated at prespecified times at a low-speed, and the ball screw shaft 59 moves downward by a prespecified length. The armature shaft 8 is then press fitted to the armature core 20, at a prespecified length, in a low-speed by means of the pressing shaft 72, and the servo motor 62 is stopped (see the conditions shown in FIGS. 1 and 2). As a result, the flat shaft catching surface 40a of the shaft catching rod 40 is in contact with the bottom of the armature shaft 8, and the shaft catching rod 40, resisting the force applied by the cylinder mechanism 26, moves downward. Simultaneously, the load receiving member 29, the measured member 30 and the measuring member 36, contacting the top face of the measured member 30, also move downward.

The process then moves to step SP5 wherein the indicated values of the linear gauge 35 and that of the load cell 70 are read by the controller.

In step SP6, the values of the load cell 70, read in step SP5, is compared with a prespecified value and is judged whether or not the value is appropriate. If the value is appropriate, the process moves to step SP7. However, if the value is not appropriate, the armature core 20 or the armature shaft 8 may be defective so that process moves to step SP9.

In step SP7, a judgement is made as to whether or not the values of the linear gauge 35 are appropriate. If the values are appropriate, the process moves to step SP8. If the values are not appropriate, the armature shaft 8 may be defective and therefore the process moves to step SP9.

In step SP8, a differential press fitting process is executed. The word "differential" means the difference between the press fitted length at that time when the constant size press fitting process is terminated, and a prespecified press fitting length to which the press fitting of the armature shaft 8 should be fitted. Specifically, the difference is calculated as the number of pulses to be fed to the servo motor 62. The servo motor 62 is operated at low-speed according to the number of the pulses, the ball screw shaft 59 is carried downward, and the armature shaft 8 is then press fitted to the armature core 20 with respect to the differential. According to the process described above, the armature shaft 8 is press fitted to the armature core 20 that is highly accurate in measurement with a length projecting from the bottom face. The process then moves to step SP11.

When the process moves to step SP9, the controller records the data indicating that the armature core 20, the armature shaft 8, or the press fitting process of the armature shaft 8 to the armature core 20 is inferior. Then, process moves to step SP10 wherein a total press fitted length from step SP2 to SP4 is calculated in order to return the vertical slider 68, the ball screw shaft 59 and the components therewith to their original positions. The total press fitted length can be obtained by summing the number of pulses generated by an encoder contained in the servo motor 62. The, process then moves to step SP14.

When the process moves to step SP11 via SP8, the indicated value of the linear gauge 35 is reread. Then, utilizing the linear gauge 35, it is determined whether or not the press fitted length of the armature shaft 8 with respect to the armature core 20 in the differential press fitting process, in step SP8, is equal to the specified press fitting length. If the press fitted length of the armature shaft 8 with respect to the armature core 20 does not equal to the objective press fitting length, the process them moves to step SP13 via, step SP12, wherein the controller records that the press fitted length of the armature shaft 8 to the armature core 20 is inferior; otherwise, the process directly moves to step SP13.

In step SP13, the total press fitted length of the temporary press fitting process SP2, the constant-size press fitting process SP4, and the differential press fitting process SP8 is determined in order to return the vertical slider 68, the ball screw shift 59, and the components therewith to their original positions. As in step SP10, the total length is obtained by summing the number of the pulses generated by the servo motor 62 in the corresponding processes. The process then moves to step SP14.

In step SP14, the cylinder mechanism 26 is shortened so that the measured members 30 are lowered and the measuring member 36 of the linear gauge 35 is simultaneously lowered.

Then, the process moves to step SP15 wherein the servo motor 62 is rotated in reverse, the number of the rotations that are equivalent to the number of the pulses determined in the steps SP10 and SP13. Then, the principal part of the press fitting operation is terminated and the apparatus is reset to the original starting position.

Then, subindex 3 rotates an additional 90 degrees in the same direction and the main index 6 rotates 90 degrees counter-clockwise. The armature core 20, press fitted with the armature shaft 8, reaches the armature core discharger 81, the turn table 19 stops, and the armature core 20 is discharged by means of the core discharger 82 from the turn table 19. The discharged armature core 20 is then fed to an inferior item selecting apparatus (not shown) so that the armature cores 20, which have been determined to be inferior in the steps SP9 and SP12, are picked up.

Thereafter, the subindex 3 rotates 90 degrees in the same direction, the main index 6 rotates 90 degrees counter-clockwise, the turn table 19 is stopped, and the condition of the apparatus is initialized such that a new armature core 20 is fed to the turn table 19 by means of the armature core supplier 21. Hereafter, if required, the operation described above is repeated.

The consecutive operation of the apparatus as described heretofore, according to the preferred embodiment of the present invention, which comprise feeding of the armature core 20 and the armature shaft 8, knurlling the armature shaft 8, press fitting of the armature shaft 8 to the armature core 20, and discharging the armature core 20 press fitted with the armature shaft 8, and are consecutively executed in one machine. Therefore, there is no need to manually determine the type of armature shaft, or to manually determine the press fitting direction. Consequently, the manual labor can be greatly reduced, and the misidentification of the type of armature shaft 8 or the press fitting direction can be eliminated. Furthermore, because the press fitted length can be measured simultaneously with the press fitting of the armature shaft 8 with respect to the armature core 20, the accuracy of press fitting can be improved by the cooperative operation of the servo motor 62 and the ball screw 56. More specifically, in most cases, the required accuracy of dimensions of the armature core 20 with respect to the armature shaft 8 is more stringent than those of the individual components, the armature core 20 and the armature shaft 8. The preferred embodiment can guarantee the more stringent requirements and improve the reliability of the product. Furthermore, although the armature shaft 8 is worn by the ball screw 56 and the cylinder mechanism 26, the force applied to the armature shaft 8 is only sufficient for supporting the shaft 8. Consequently, the force is so weak that the possibility of bending the armature shaft 8 is eliminated.

This invention may be practiced or embodied in still other ways without departing from the spirit or essential character thereof. For example, in the above embodiment, four arms are provided with the subindex 3 and the armature cores 20 are fitted at a plurality of positions on the outer surface of the main index 6 so as to divide the surface into quarters such that the subindex 3 and the main index 6 are stopped respectively at the four stations. However, if necessary, the number of the stations can be increased.

Therefore, the preferred embodiment described herein is illustrative and not restrictive, the scope of the invention is indicated by the appended claims, and all the variations which fall within the scope of the claims are intended to be embraced therein.

What is claimed is:
1. A press fitting method comprising the steps of:
   (a) temporarily press fitting a press fitting body, from the top of a press fitted part of a press fitted member located at a prespecified height with respect to the press fitted part, such that a ball screw shaft, of a ball screw, is moved downward by means of a servo motor so that the press fitting body is press fitted to the press fitted part at a prespecified length;
   (b) executing a zero adjustment of a linear gauge and a load cell, wherein the linear gauge is composed such that a measuring member is in contact with the top end of a measured member which moves together with the press fitting body, and the load cell is composed so as to measure a press fitting force of the press fitting body;
   (c) constant size press fitting, which is also executed to the press fitted member of the press fitting body at a prespecified length;
   (d) differential press fitting, executed in the case where the measured results of the linear gauge and those of the load cell, at the time when the constant size press fitting process is terminated, are within prespecified ranges, wherein the press fitting body is press fitted to the press fitted member according to a difference between the measured results and a specified press fitting length, so that consequently the specified press fitting length of the press fitting body with respect to the press fitted member can be attained; and

(e) determining, whether or not the press fitted length, set by the differential press fitting step, equals the specified press fitting length.

2. A press fitting apparatus comprising:
(a) a base plate;
(b) a bearing, provided on the base plate, with a vertical shaft axis;
(c) a ball screw, provided with the bearing, permitting rotation of a rotor and supporting a ball screw shaft which is vertically movable, while the ball screw prevents movements along with the direction of the shaft axis and rotation of the ball screw shaft;
(d) a servo motor for rotating the rotor of the ball screw;
(e) a movable body connected to a bottom of the ball screw shaft, having a load measuring member inserted between the bottom of the ball screw shaft and the movable body, and having a pressing shaft which is coaxial with the ball screw shaft so as to make the pressing shaft movable along the direction of movement of the ball screw shaft;
(f) a cylinder mechanism, located below the base plate, containing a vertical piston rod;
(g) a load receiving member containing a measured member, which is connected to and provided on the piston rod;
(h) a linear gauge fitted with the base plate for engaging the measuring member which contacts the measured member at a predetermined pressure; and
(i) an exclusive shaft provided on the load receiving member which is coaxial with the pressing shaft, at the top end, has a removable stopper with a press fitting body catcher, and is connected to the load receiving member;
whereby a press fitting force of the press fitting body which is applied to the press fitted member, and a press fitted length can be measured.

3. A press fitting method according to claim 1, wherein the press fitting body is an armature shaft of a motor, the press fitted member is an armature core of the motor, and the press fitted part is a shaft hole of the armature core.

4. A press fitting apparatus according to claim 2, wherein the press fitting body is an armature shaft of a motor, the press fitted member is an armature core of the motor, and the press fitted part is a shaft hole of the armature core.

* * * * *

UNITED STATES PATENT AND TRADEMARK OFFICE
CERTIFICATE OF CORRECTION

PATENT NO. : 5,315,752

DATED : May 31, 1994

INVENTOR(S) : Masami OHTA et al.

It is certified that error appears in the above-identified patent and that said Letters Patent is hereby corrected as shown below:

Title page, Item [54], change "FITING" to --FITTING--.
Col. 1, line 2, change "FITING" to --FITTING--.

Signed and Sealed this

Twenty-third Day of August, 1994

Attest:

BRUCE LEHMAN

Attesting Officer

Commissioner of Patents and Trademarks